Figure 4:
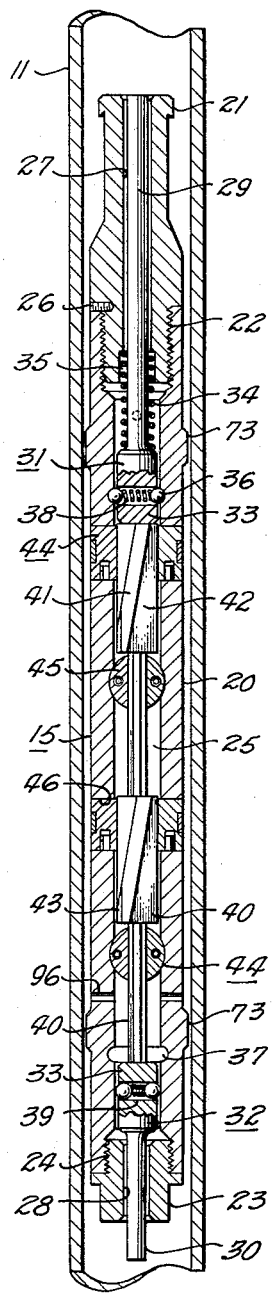

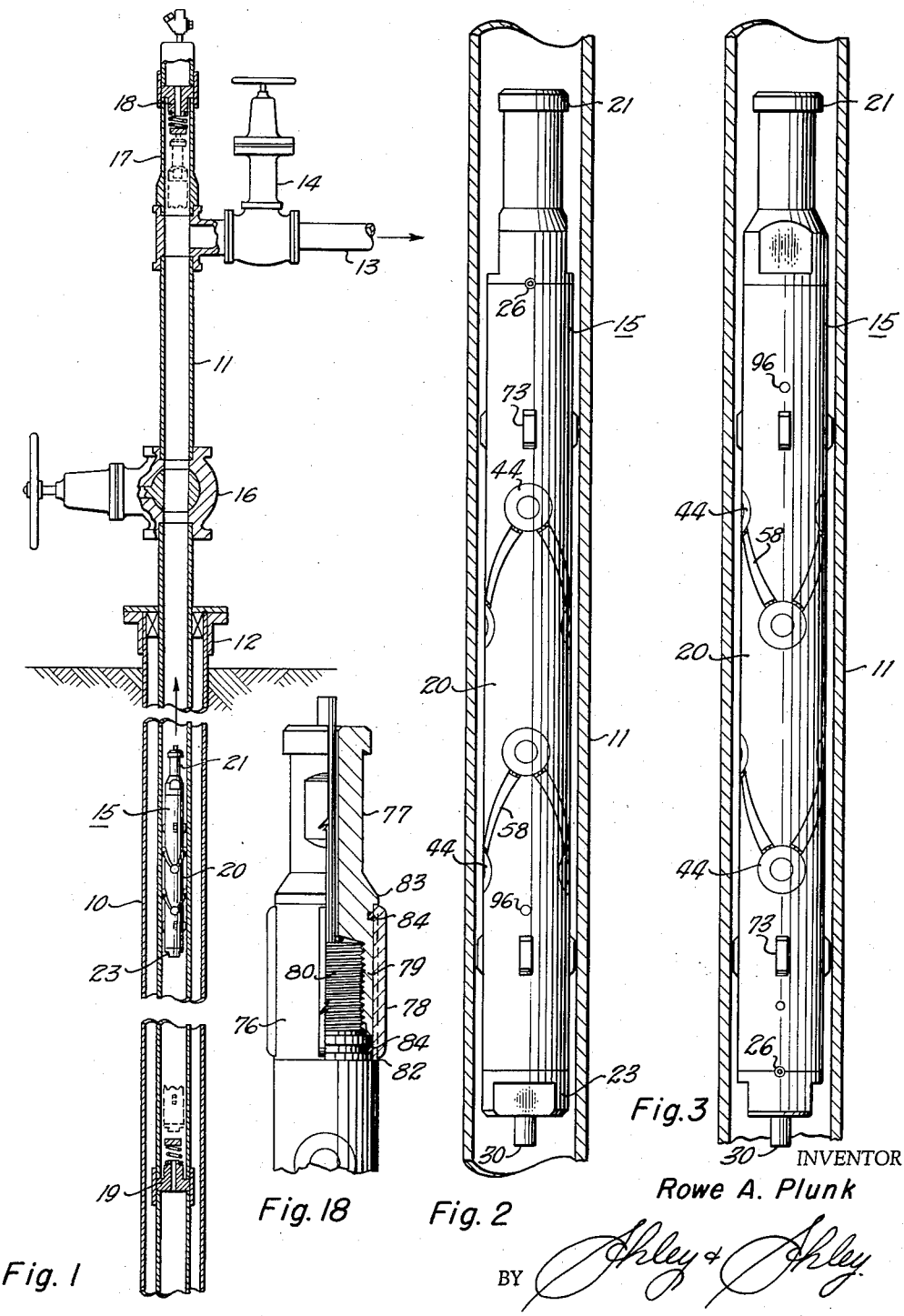

May 17, 1966 R. A. PLUNK 3,251,306
WELL PIPE SCRAPING AND SEALING DEVICE
Filed Oct. 31, 1960 6 Sheets-Sheet 2

INVENTOR
Rowe A. Plunk

BY *Shley & Shley*

ATTORNEYS

May 17, 1966  R. A. PLUNK  3,251,306
WELL PIPE SCRAPING AND SEALING DEVICE
Filed Oct. 31, 1960  6 Sheets-Sheet 3

INVENTOR
Rowe A. Plunk
BY *Ahley & Ahley*
ATTORNEYS

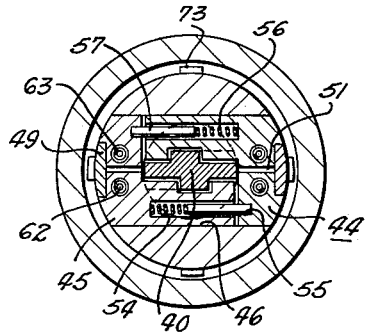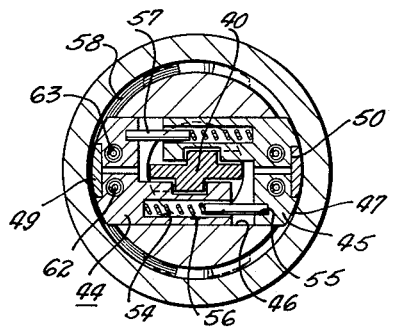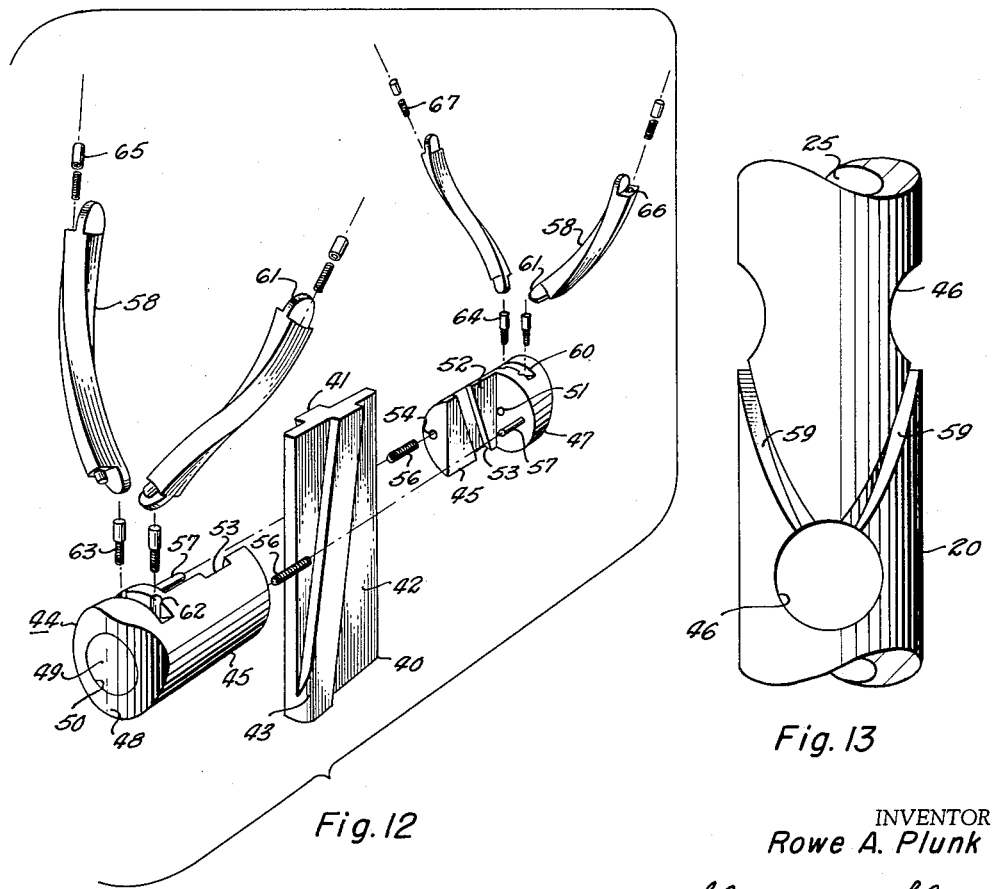

May 17, 1966   R. A. PLUNK   3,251,306
WELL PIPE SCRAPING AND SEALING DEVICE
Filed Oct. 31, 1960   6 Sheets-Sheet 5
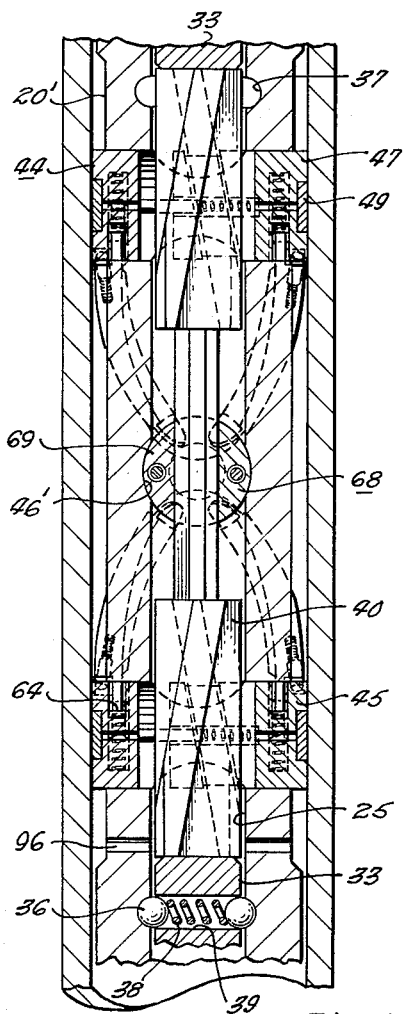
Fig. 14
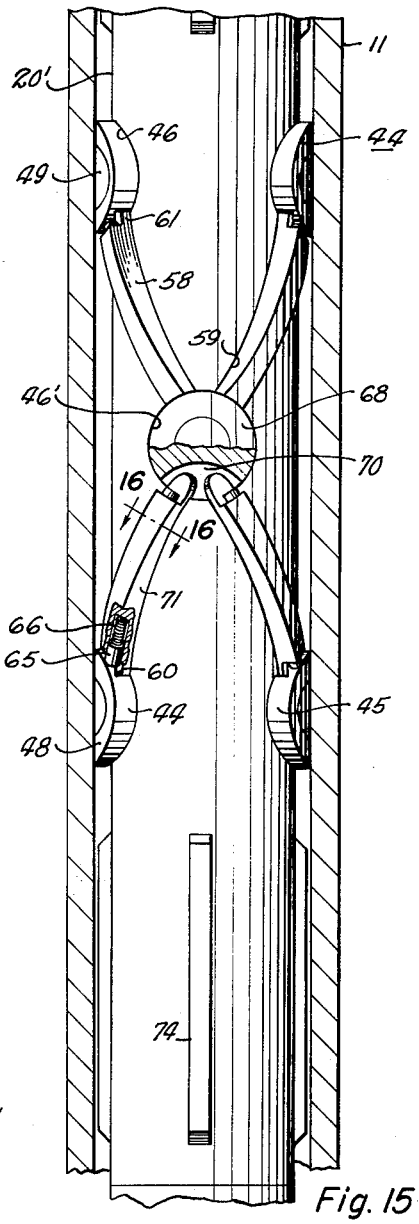
Fig. 15
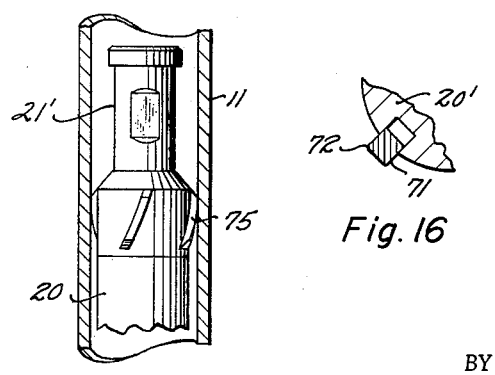
Fig. 16   Fig. 17
INVENTOR
Rowe A. Plunk
BY
ATTORNEYS May 17, 1966 R. A. PLUNK 3,251,306
WELL PIPE SCRAPING AND SEALING DEVICE
Filed Oct. 31, 1960 6 Sheets-Sheet 6

INVENTOR
Rowe A. Plunk
BY
ATTORNEYS

United States Patent Office  3,251,306
Patented May 17, 1966

3,251,306
WELL PIPE SCRAPING AND SEALING DEVICE
Rowe A. Plunk, P.O. Box 1167, Midland, Tex.
Filed Oct. 31, 1960, Ser. No. 66,135
5 Claims. (Cl. 103—52)

This invention relates to new and useful improvements in devices for scraping and sealing the bores of well pipe.

One object of the invention is to provide an improved device of the piston or plunger type having means for scraping paraffin from the bore of well tubing or other well pipe, wherein the scraping means is adapted to be sealingingly engaged with the tubing to permit lifting of the well fluids above the device by the pressure of fluid therebelow imparting upward movement to said device.

Another object of the invention is to provide an improved paraffin scraping device of the piston type having means which is mounted for expansion and retraction so as to scrapingly engage the bore of well pipe during upward movement of the device and be disengaged from the pipe during downward movement so as to permit free falling of the device through the well fluids even though the fluids are moving upwardly.

An important object of the invention is to provide an improved device, of the character described, having novel actuating means for expanding and retracting the scraping means into and out of substantially positive sealing engagement with the bore of the well and for holding said scraping means in expanded and retracted positions, the actuating means being operated automatically by striking bumpers upon reciprocal movement of the device between the bumpers whereby said device is adapted for use in wells which are flowing or in which the well fluids are being lifted by the injection of fluid under pressure.

An important object of the invention is to provide an improved device, of the character described, having a plurality of scraping elements which coact to seal off between the device and the bore of the well pipe during upward travel of said device, the elements being supported by members which are movable transversely of the device by the actuating means for expanding and retracting said elements, there being means associated with said elements for sealing off between the adjacent portions of said elements.

A further object of the invention is to provide an improved device, of the character described, wherein the actuating means includes a reciprocal element having connection with the supporting members so as to reciprocate said members transversely of the device whereby said members are moved outwardly and inwardly into and out of sealing engagement with the bore of the well pipe in coaction with the scraping elements.

A construction designed to carry out the invention will be hereinafter described, together with other features of the invention.

The invention will be more readily understood from a reading of the following specification and by reference to the accompanying drawings, wherein examples of the invention are shown, and wherein:

FIG. 1 is a schematic view of a well tubing having a device constructed in accordance with the invention and with its scraping and sealing means in expanded position for upward movement between lower and upper bumpers.

Figure 5:
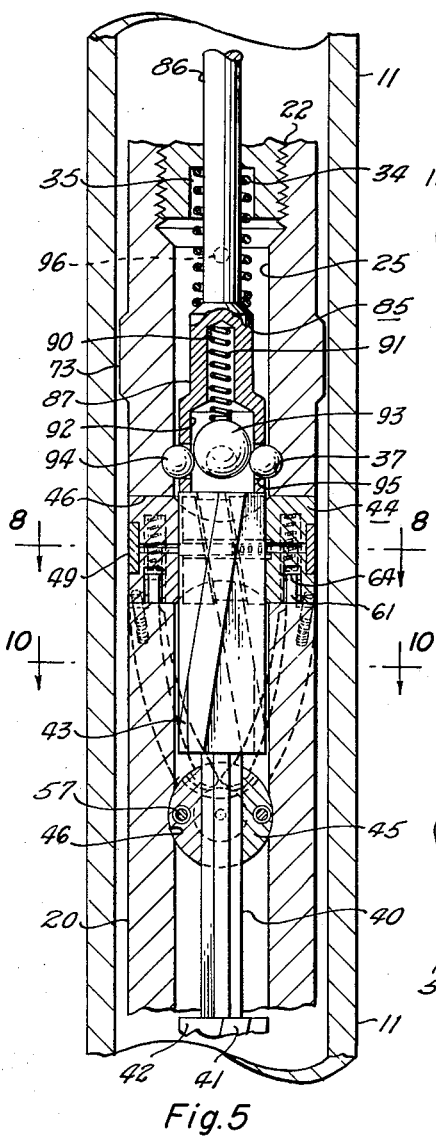
Figure 10:
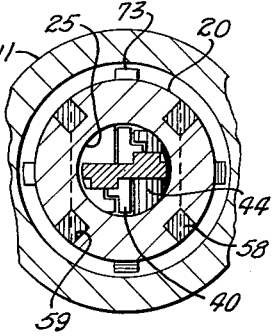
Figure 11:
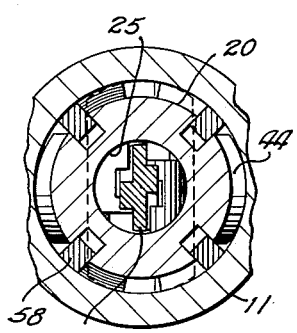
Figure 6:
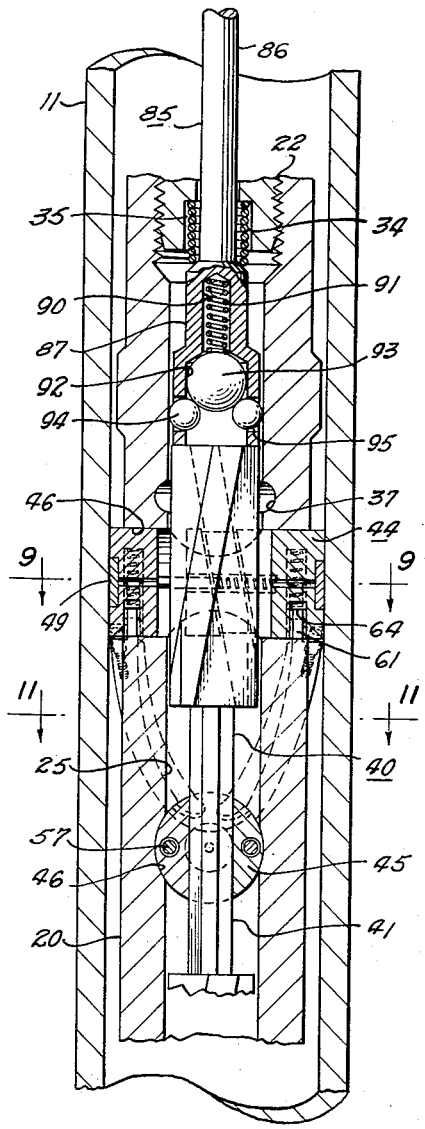
Figure 7:
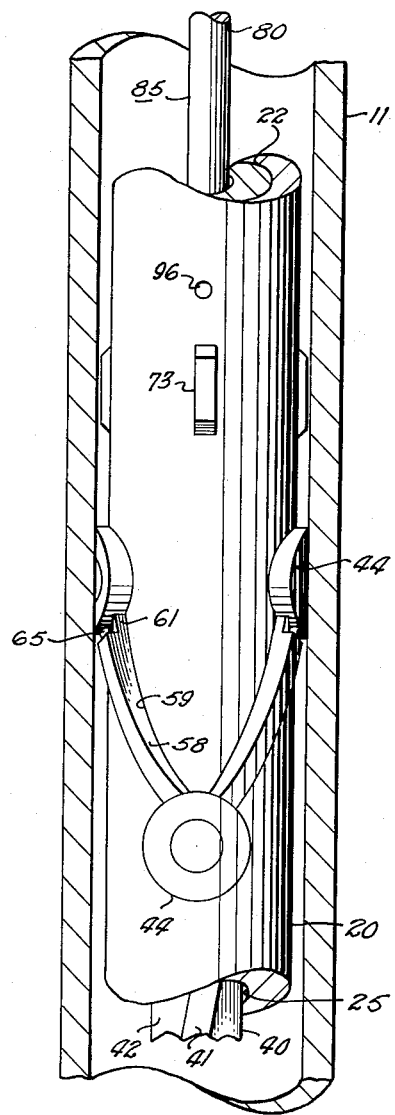
Figures 19, 20, 21, 22:
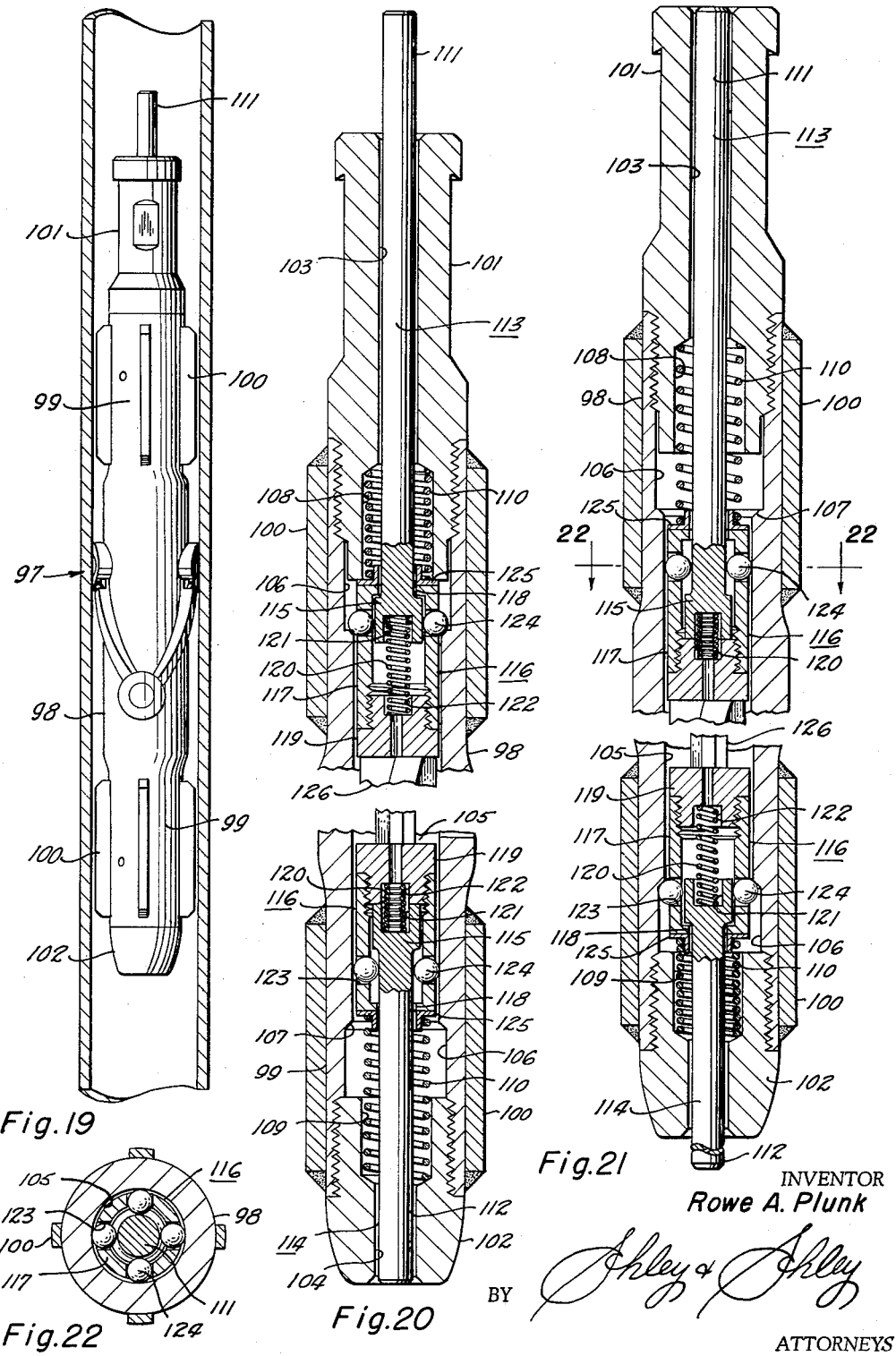

FIG. 2 is a side elevational view of the device with its scraping and sealing means retracted for downward movement in the well tubing, FIG. 3 is a view similar to and taken at a right angle to FIG. 2, FIG. 4 is a longitudinal, sectional view of the device, showing the relationship of its parts in retracted position, FIG. 5 is an enlarged, longitudinal, sectional view of the upper portion of the device with its parts in retracted position and having modified actuating means, FIG. 6 is a view, similar to FIG. 5, showing the relationship of the parts in expanded position, FIG. 7 is a side elevational view, similar to FIG. 6, FIG. 8 is a horizontal, cross-sectional view, taken on the line 8—8 of FIG. 5, FIG. 9 is a view, similar to FIG. 8, taken on the line 9—9 of FIG. 6, FIG. 10 is a horizontal, cross-sectional view, taken on the line 10—10 of FIG. 5, FIG. 11 is a view, similar to FIG. 10, taken on the line 11—11 of FIG. 6, FIG. 12 is an enlarged, exploded, perspective view of one of the scraping and sealing means and its actuating means, FIG. 13 is an enlarged, side elevational view of a portion of the body of the device with its parts removed, FIG. 14 is an enlarged, longitudinal, sectional view of the medial portion of a modified device, showing the relationship of its parts in expanded position, FIG. 15 is a side elevational view, similar to FIG. 14, FIG. 16 is a cross-sectional view, taken on the line 16—16 of FIG. 15, FIG. 17 is a side elevational view of the upper portion of a slightly modified device, FIG. 18 is a side elevational view, partly in section, of the upper portion of another modified device, FIG. 19 is a side elevational view of a further modified device with its scraping and sealing means in expanded position, FIG. 20 is an enlarged, longitudinal, sectional view of the device shown in FIG. 19, only a portion of the actuating means being shown, FIG. 21 is a view, similar to FIG. 20, showing the relationship of the parts of the modified device in retracted position, and FIG. 22 is a horizontal, cross-sectional view, taken on the line 22—22 of FIG. 21.

In the drawings, the numeral 10 designates a well casing having a well tubing or other pipe 11 extending therethrough and suspended from a casing head 12 at the upper end of the casing. An outlet line 13 extends laterally from the upper end portion of the tubing 11, which projects above the casing head 12, for receiving the well fluids that flow upwardly in said tubing and a suitable control valve 14 is mounted in the line. This upward flow may be due to the pressure of the well fluids or the pressure of an auxiliary lifting fluid, such as air or gas, which is admitted into the lower portion of the tubing below the well fluid level therein by one or more suitable flow valves (not shown). In order to facilitate installation and removal of a device or piston 15 embodying the principles of the invention for scraping paraffin from and sealing the bore of the tubing 11, a valve or other mechanism 16 for closing said tubing bore is mounted in said tubing between the casing head 12 and outlet line 13. A tubular extension or housing 17 is connected to the tubing above the line to permit upward movement of the upper end portion of the device 15 past said line so that the well fluids above said device are discharged. Since the device is of the automatic self-reversing type, a spring-pressed bumper or stop 18 is mounted in the upper end of the tubular extension 17 for engagement by the upper end of said device. At a suitable point below the level of the well fluids in the tubing, the lower end of the device 15 is adapted to engage a similar bumper or stop 19 mounted in the lower portion of said tubing. If desired, a catcher (not shown) for supporting the device may be provided in the tubular extension or the tubing immediately therebelow, such as shown by Patent No. 2,893,493.

The paraffin scraping and sealing device 15 includes an elongated, cylindrical body or housing 20, of slightly less diameter than the bore of the tubing 11, and has a fitting, such as a conventional fishing neck 21, secured to its upper end by a screw-threaded pin and box connection 22 (FIG. 4). A suitable fitting, such as a shouldered pin or plug 23, is screw-threaded in a box 24 formed in the lower end of the body 20 which has an axial, cylindrical bore 25 extending therethrough. As shown in FIGS. 2–4, the fishing neck and plug may be secured against disconnection from the body by suitable set screws 26. The fishing neck 21 and plug 23, respectively, have axial, cylindrical bores 27 and 28 communicating with the bore 25 of the body and of reduced diameter for slidably receiving the complementary extensions or stems 29 and 30 of actuating elements or push rods 31 and 32 mounted in said body bore. An enlarged head 33 is formed on the inner end of each of the push rods 31 and 32 and is reciprocable within and complementary to the bore of the body so as to substantially close the ends thereof. The upper push rod is constantly urged inwardly or downwardly by a helical spring 34 which is confined on its stem 29 between its head and the fishing neck, the lower end of the bore 27 of said neck being enlarged to provide a counterbore or socket 35 for receiving the upper end of the spring. Each push rod is adapted to be resiliently held in an inward or retracted position by a pair of balls 36, which are carried by each head 33, engaging in a radial groove or recess 37 formed in the bore 25 (FIGS. 4 and 14). A helical spring 38 is confined between the balls 36 in an opening 39 extending diametrically through each head for urging said balls radially outward into engagement with the bore or its groove 37. As will be explained, the push rods are adapted to reciprocate in unison and one of said rods is retracted when the other rod projects from the device 15 for engagement with one of the bumpers 18 and 19.

The push rods 31 and 32 are operatively connected by a plurality of upright, superimposed wedge members or plates 40 interposed therebetween and extending longitudinally of the bore 25 of the body 20 so as to cause outward movement or projection of one of said rods upon retraction or inward movement of the other rod. In effect, the push rods form continuations of the wedge plates which may be made integral therewith and/or with one another and which coact to provide actuating means. Due to economy of manufacture and maintenance as well as ease of assembly, it is preferable to form the wedge plates 40 separately. Although the spring 34 acts to constantly urge the push rods and wedge plates downwardly, a similar spring could be provided below the lower rod to bias said rods and plates upwardly. As will be explained hereinafter, a pair of similar springs are shown in FIGS. 20 and 21. Each wedge plate 40 is rectangular, of greater length than width, of greater width than thickness, such width being substantially equal to the diameter of the body bore, and adjacent plates are disposed at right angles to one another. An inclined rib or land 41 extends longitudinally of each of the opposed flat faces 42 of each wedge plate from one of the lower corners thereof to the intermediate portion of its upper margin (FIG. 12). The opposed ribs, which are rectangular in cross-section, of each plate 40 have opposite inclinations, extending from opposite lower corners of said plate and crossing each other so as to provide overlapping upper end portions. As shown by the numeral 43, the lower end portions of the ribs 41 are of reduced width.

A plurality of cylindrical plungers or supporting members 44 are provided for actuation by the wedge plates 40, the number of plungers controlling the quantity of wedge plates. Each plunger includes a pair of halves or sections 45 which are slidably mounted in a complementary transverse opening or bore 46 (FIG. 13) that extends diametrically through the body 20, being of larger diameter than and communicating with its bore 25 so as to support the plunger throughout its length. Since adjacent wedge plates are disposed at right angles to one another, adjacent openings 46 extend at right angles to one another with alternate plates and openings being alined (FIG. 4). As shown most clearly in FIG. 12, the sections 45 of each plunger 44 are identical and each has a circular outer end portion or head 47 which terminates in an arcuate or bevelled outer end surface 48 that conforms to the curvature of the exterior of the body. A circular disk or plug 49, of wear-resistant metal, may be mounted in a complementary recess 50 in each head 47 with its outer surface conforming to the outer end surface 48. In order to permit replacement thereof, the disk 49 has a press-fit in the recess 50 from which an axial opening 51, of reduced diameter, extends inwardly through the head to permit driving of said disk out of said recess (FIGS. 8 and 9).

The major portion of each plunger section 45 is semi-cylindrical and has an inner, upright, flat face 52 in which an inclined groove or recess 53 is formed for complementary, sliding engagement with one of the ribs 41 of the wedge plate 40. The grooves are of slightly greater width than the ribs to facilitate relative sliding movement and permit inward movement of the expanded plungers to clear irregularities and other obstructions in the bore of the tubing. As shown in FIGS. 8 and 9, the length of each flat face 52 is substantially equal to the width of the wedge plate whereby the faces of the plunger sections overlie the flat faces 42 of said wedge plate and the inner ends of said sections, when retracted, are contiguous the inner surfaces of the heads 47. Alined, cylindrical openings or sockets 54 and 55 are formed in the inner end of each plunger section and the inner surface of its head, respectively, for receiving helical springs 56 and pins 57 which aline and urge the sections of each plunger apart.

It is noted that the wedge plates 40 are maintained in an upright position by the axial bore 25 of the body 20, that the plungers 44 are supported by said wedge plates and that the ribs of said plates provide bearing surfaces for the sections of said plungers and maintain said sections against rotation and in spaced relationship so as to prevent interference with each other. Due to the inclination of the ribs 41 and the coacting grooves 53, the plungers are retracted and have their outer end surfaces 48 at least flush with the exterior of the body when the wedge plates are in their lower position (FIGS. 4, 8 and 10). Upon movement of the wedge plates to their upper positions, as shown in FIGS. 9, 11 and 14, the plungers are expanded into engagement with the bore of the tubing 11.

For sealing off between the device 15 and the tubing during upward movement of said device, a plurality of elongated sealing elements or ring segments 58 are provided for coacting with the plungers 44 and movement with their sections. As shown most clearly in FIG. 13, a pair of external grooves or recesses 59 extend at helical arcs or angles between the ends of adjacent openings 46 for seating engagement by the complementary sealing elements. Although rectangular in cross-section, the sealing elements 58 are twisted so as to conform to the helical contours of the grooves 59. An elongated, radial groove or slot 60 is formed in the head 47 of each plunger section 45 to confine a pair of tangs or tongues 61 on the ends of adjacent sealing elements (FIG. 12), the thickness of the tangs being slightly less than the width of the slot whereby said tangs have a snug fit therein. The tangs 61 are formed by rounding the ends of the elements and reducing the thickness of said ends so as to dispose said tangs inwardly of the outer surfaces of said elements, whereby said outer surfaces are flush with the outer end surfaces 48 of the plungers when said tangs are engaged in the slots 60 (FIGS. 6, 7, 11, 14 and 15). Manifestly, the expanded plunger and elements coact to form a ring which encircles the body 20 for sealing off therearound and, due to the helical arrangement of the elements, their upper edges or margins provide cutting or shearing edges for cutting or slicing paraffin from the bore of the tubing upon upward movement of the device. A pair of cylindrical, transverse openings or sockets 62 may intersect each slot 60 at its inner wall of each section of at least one of the plungers 44 which is common to a group of coacting elements, and helical springs 63 may be disposed in the sockets for urging cylindrical, hollow pins or cups 64 into engagement with the tangs 61 that are confined in the slot so as to urge the sealing elements toward the plunger supporting the opposite ends of said elements. If desired, all of the plungers may be provided with the sockets 62 and spring-pressed pins 64 which minimize binding of the elements 58 in their grooves 59 and which tend to urge said elements into sealing engagement with the plungers, particularly, when said sockets and pins are at only one of the ends of said elements. In order to more effectively seal off between the plungers and the ends of the elements externally of the tangs, a cylindrical hollow pin or cup 65 may be provided for bridging the space therebetween. Each end of each sealing element has an opening or socket 66 for receiving a helical spring 67 to urge the pin 65 into engagement with the head 47 of each plunger section 45 externally of its slot 60.

At least two of the plungers 44 and four of the elements 58 are required to seal off around the body 20 of the device 15, but a greater number may be employed. For example, four plungers and eight sealing elements are shown in FIGS. 1–7 arranged in two coacting groups or sets with only two of the plungers being shown in FIGS. 5–7. Three plungers and eight elements are shown in FIGS. 14 and 15, wherein the intermediate or middle plunger 68 coacts with two sets of four elements each and each of the sections 69 of said middle plunger has opposed grooves or slots 70, similar to the slots 60, for receiving the tangs 61 of the elements of both sets. With the exception of the slots 70, the plunger 68 is identical to the plunger 44 and is slidably mounted in the same manner in an opening 46′ extending diametrically through a body 20′ which is similar to the body 20. If desired, the lower sealing elements may be modified when more than one group or set of elements is employed. As shown in FIG. 16, each element 71 of the lower group may have a bevelled or rounded upper edge or margin 72 so as to reduce resistance to upward movement of the device. The slicing action of the elements 58 of the upper group is sufficient to remove the paraffin from the bore of the tubing. In FIGS. 19–21, a pair of plungers and four sealing elements form a single coacting group or one-half of the arrangement of FIGS. 1–7. In each instance, at least one contractible, segmental ring is provided by the coaction of the plungers and elements for encircling and sealing off around the body. The embodiments of the invention shown in FIGS. 1–7, 14 and 15 have two rings, while the embodiment of FIGS. 19–21 has one ring. The rings of FIGS. 14 and 15 are staggered or offset in comparison to the alined relationship of the rings of FIGS. 1–7. Except for the arrangement of the plungers and sealing elements, the structure of FIGS. 14 and 15 may be identical to the construction of FIGS. 1–4. Accordingly, the same numerals have been used to designate the parts which are identical. The structure of FIGS. 5–7 is identical with the exception of the actuating means, while the structure of FIGS. 19–21 is similar to the other constructions.

Upright, radially-spaced, guide members or ribs 73 extend longitudinally of the upper and lower end portions of the body 20 for alining the device 15 in the tubing and protecting the plungers and elements from contact with said tubing during descent of said device. The guide ribs may be of short length as shown in FIGS. 1–7 or may be elongated as shown by the numeral 74 in FIGS. 14 and 15. If desired, the guide ribs may be helically arranged as shown by the numeral 75 in FIG. 17 and mounted on the end fittings of the device, such as on the lower portion of a fishing neck 21′, instead of on the body. As shown in FIG. 18, the guide ribs may be removably mounted for replacement, such as by a sleeve 76 confined on an end fitting or fishing neck 77 and having ribs 78 thereon which may be similar to the ribs 74 or the other ribs. A screw-threaded box 79 is provided at the lower end of the fishing neck 77 for receiving a complementary pin 80 on the upper end of a body 81, similar to the body 20 and having its upper end reduced in diameter to provide an external, radial shoulder 82 for engagement by the lower end of the sleeve 76. The box 79 has a similar shoulder 83 engaging the upper end of the sleeve, rotation of which may be prevented by one or more O-rings 84 of elastic material.

A modified push rod arrangement is illustrated in FIGS. 5 and 6 and includes an actuating element or push rod 85, similar to the push rods 31 and 32 (FIG. 4) and having a similar extension or stem 86 and head 87. The latter has an axial bore 90 for receiving a helical spring 91 and a counterbore 92 at its inner portion in which a spherical member or ball 93, of large diameter, is mounted for engagement with the spring and a plurality of small balls 94. Transverse openings 95 in the head 87 communicate with the counterbore 92 and support the balls 94 for engagement and disengagement with the groove 37 in the bore 25 of the body 20 of the device 15. The spring 91 and large ball 93 perform the same function as the spring 38 in that the same constantly urge the small balls 94 radially outward and coact therewith to provide a resilient latch for holding the push rod 85 in its retracted or inward position, but are preferred because said large ball rests on said small balls and exerts minimum outward force thereon when said push rod is in its outward or projected position (FIG. 6). When the large ball moves between the small balls upon registration of the openings 95 with the groove 37, said large ball exerts a greater outward force on said small balls and positively forces the same into engagement with said groove. Consequently, this arrangement offers less resistance to the movement of the push rod 85, while providing a more positive latch than the balls 36 and spring 38. It is noted that the spring 34, which urges the push rods 31 and 85 inwardly, is relaxed or uncompressed when said rods are retracted (FIGS. 4 and 5) and is compressed by the outward movement or projection of said rods (FIG. 6). As a result, there is no tendency for the spring 34 to unlatch the push rod from its retracted position. Instead, the spring assists the bumper in moving the rod inwardly. As shown by the numeral 96, radial vent ports may communicate with the bore of the body adjacent the heads of the push rods to prevent the trapping of well fluids in the end portions of said bore and interference with the outward movement of said rods.

As set forth hereinbefore, a single set of sealing elements and plungers may be employed for engagement with the bore of the well tubing 11 and are designated generally by the numeral 97 in FIG. 19. The body 98 of the modified device may have end portions 99, of reduced diameter, upon which elongated guide ribs 100 are mounted. Due to the reduced end portions, a greater flow area is provided around the guide ribs and there is less resistance to movement of the body through the well fluids. Of course, the end portions of the other bodies 20 and 20′ could be reduced in the same manner. A fishing neck 101 and plug 102, similar to and of smaller diameter than the end fittings 21 and 22, are screw-threaded in the respective upper and lower ends of the body 98 and have axial bores 103 and 104 communicating with and of less diameter than the axial bore 105 of said body (FIGS. 20 and 21). The ends of the bore 105 are enlarged in diameter to provide counterbores 106 having annular, bevelled shoulders 107 at their inner ends. Sockets 108 and 109, similar to the socket 35 of FIGS. 4–6, are formed at the inner ends of the respective bores 103 and 104 for receiving the outer ends of helical springs 110 which are confied on the cylindrical extensions or stems 111 and 112 of actuating elements or push rods 113 and 114. The stems 111 and 112 are slidable in the bores 103 and 104 and the inner end of each stem is enlarged to provide a boss 115 for supporting a cylindrical head 116 that is slidable on each stem and in the bore of the body. Each head 116 includes a sleeve 117 having an internal, radial flange 118 at its outer end for engagement with the boss 115 of each stem, and a flanged plug 119 is screwthreaded in the inner end of the sleeve. A helical spring 120, of less strength than the spring 110, is confined in each sleeve 117 between each stem boss and the plug 119 for constantly urging the head 116 inwardly of each of the stems 103 and 104, the stem boss and plug having axial recesses or sockets 121 and 122 in which the ends of the spring are engaged. Each sleeve has a plurality of transverse openings 123 adjacent its flange 118 for supporting spherical members or balls 124 (FIG. 22). Although the inner ends of the springs 110 may bear against the flanges 118, it is preferable to interpose a flanged collar or follower 125 therebetween. A pair of wedge members or plates 126, identical to the wedge plates 40 and which may be integral with the push rods and/or each other, are mounted in the bore 105 of the body 98 for reciprocating in unison with said rods to expand and retract the plungers and sealing elements.

The springs 110 constantly urge the push rods 111 and 112 inwardly and are compressed by the outward movement or projection of said rods. In its outward position, the balls 124 of the projecting rod are disposed in the counterbore 106 and are held in engagement with the bevelled shoulder 107 by the compressed spring 110 and the boss 115 of the stem. Upon inward movement of the push rod, the stem boss moves inwardly of the head 116 and past the balls to permit said balls to move radially inward into engagement with the stem of said rod and ride over the shoulder into the bore 105 of the body 98. The force of the spring 110 holds the push rod in its inward or retracted position. When the push rod is moved outwardly by the inward movement of the other push rod, the spring 110 is compressed by the outward movement of the head and the balls 124 ride over the shoulder 107 into the counterbore. The flange 118 of the sleeve 117, or the spring follower 125, strikes the inner end of the fitting 101 or 102 and the stem is moved outwardly by the compressed spring 120 until its boss 115 engages said flange and rides between the balls so as to force the same outwardly into engagement with the counterbore 106. This outward movement of the push rod is assisted by the expansion of the compressed spring 110 of the other rod which is pushed inwardly by impact with the bumper 18 or 19. Due to the diameter of the stem boss, the balls of the projecting push rod are held in the counterbore in engagement with the shoulder 107 to prevent "bouncing" or reverse movement. Although the spring 120 of the projecting push rod urges its stem outwardly relative to its head 116 so as to position its boss between its balls, little force is required to compress said spring and push the stem and boss inwardly to permit retraction of said balls upon inward movement of said head when said stem strikes its respective bumper. It is noted that the foregoing push rod arrangement is interchangeable with the push rod arrangements of FIGS. 4–6, but provides a more positive latch for the push rods.

In operation, the paraffin scraping and sealing device 15 or any of the modifications thereof is dropped or lowered by gravity through the well tubing 11 with the stem of its upper push rod retracted and the stem of its lower push rod porjecting from its body, such as shown in FIGS. 1–5 and 21. Since the wedge plates are in their lower position, the plungers and sealing elements are retracted substantially flush with the exterior of the body and are prevented from engaging the bore of the tubing by the guide ribs. When its stem strikes the lower bumper 19, the lower push rod is retracted or forced inwardly to elevate or raise the wedge plates and thereby lift the upper push rod and cause projection of its stem. As shown in FIGS. 6, 7, 9, 11, 14, 15, 19 and 20, this upward movement expands the plungers and sealing elements into engagement with the bore of the tubing. Due to the sealing engagement of the plungers and elements, the well fluids are prevented from flowing past the device with the result that said device is lifted by the pressure therebelow so as to lift the fluids thereabove. The upper edges of the sealing elements, particularly the uppermost elements, scrape paraffin and other deposits from the bore of the tubing during upward travel of the device. Since the device functions as a piston, the gas or other lifting fluid is prevented from channeling through the liquids and is conserved so as to require less lifting pressure. This is made possible by the positive engagement of the plungers and sealing elements with the tubing bore and such engagement is permitted by the retractable mounting of said plungers and elements. When its stem strikes the upper bumper 18, the upper push rod is forced inwardly or retracted so as to depress the wedge plates and lower push rod and project its stem. This downward movement retracts the plungers and sealing elements to permit descent of the device. As has been explained, the well fluids above the device are discharged through the lateral line 13 due to the upper end of said device moving past said line before the stem of its upper push rod strikes the upper bumper.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. A scraping and sealing device for movement in the bore of a well pipe between stops including a piston having a longitudinal bore and an external circumferential groove, segmental ring means mounted in the groove for expansion and retraction into and out of sealing engagement with the pipe bore, members movable transversely of the piston between its bore and groove for expanding and retracting the ring means, actuating means slidably mounted in the bore of said piston for moving the members inwardly and outwardly to expand and retract said ring means by upward and downward reciprocation, push rods at the ends of the actuating means and projecting axially from said piston for engagement with the stops to reciprocate said actuating means to and from an upper expanding position and a lower retracting position, said piston bore having end portions of reduced diameter for receiving the push rods and an enlarged portion adjacent and inwardly of at least one of the reduced end portions, an enlarged head on the inner end of at least one of said push rods movable between said piston bore and the enlarged bore portion upon reciprocation of the push rods, means loosely connecting the head of said push rod to said actuating means to permit limited relative reciprocal movement of said heated rod and having at least a portion thereof movable between said piston bore and its enlarged portion upon reciprocation of said actuating means, a plurality of balls loosely confined by the connecting means in surrounding relation to said push rod for inward and outward transverse movement and reciprocal movement with said connecting means between said piston bore and its enlarged portion, a first spring for constantly urging said headed rod outwardly and for holding its head between the balls when said head and balls are in said enlarged bore portion to releasably lock said actuating means in one of its positions, said actuating means being reciprocated into the latter position by inward movement of the other push rod, and a second spring of greater strength than the first spring for constantly urging said actuating means into the other of its positions so as to dispose said head and balls within said piston bore whereby inward movement of said headed rod moves its head from between said balls as well as reciprocates said actuating means to permit said balls to move from said enlarged bore portion into said piston bore, the greater strength of the second spring holding said actuating means in the latter position until it is reciprocated by inward movement of said other push rod so as to again dispose said head and balls in said enlarged bore portion.

2. A device as set forth in claim 1 wherein the second spring is confined upon the headed push rod and bears against the connecting means.

3. A device as set forth in claim 2 wherein each end of the device is identical and each includes the enlarged portion of the bore of the piston adjacent and inwardly of each reduced end portion of said piston bore, the enlarged head of each of the push rods, the means for loosely connecting each head of each push rod to the actuating means and for loosely confining the balls for movement between said piston bore and its enlarged portion, the first spring for constantly urging each push rod outwardly, and the second spring confined upon each push rod and bearing against each connecting means for urging said actuating means in opposite directions.

4. A device as set forth in claim 1 wherein the connecting means includes a sleeve surrounding the head of the headed push rod and having radial openings for loosely confining the balls, the sleeve having an internal flange at its outer end for engagement with the outer end of said head to confine the latter within said sleeve.

5. A device as set forth in claim 4 wherein the second spring is confined upon the headed push rod and bears against the outer end of the sleeve.

References Cited by the Examiner

UNITED STATES PATENTS

| 1,772,710 | 8/1930 | Denney | 166—212 |
| 2,203,966 | 6/1940 | Otis | 166—174 |
| 2,674,951 | 4/1954 | Zaba | 103—52 |
| 2,728,398 | 12/1955 | Taylor | 166—170 |
| 2,850,339 | 9/1958 | Vincent | 103—52 |
| 2,937,598 | 5/1960 | Brown | 103—52 |
| 2,940,523 | 6/1960 | Brown et al. | 166—55.8 |

ROBERT M. WALKER, *Primary Examiner.*

BENJAMIN BENDETT, JOSEPH H. BRANSON, JR.,
*Examiners.*

MARK NEWMAN, D. C. BLOCK, *Assistant Examiners.*